March 10, 1970     F. H. ANCKER     3,499,957

METHOD FOR PRODUCING SUBSTANTIALLY UNIFORM CALENDERED MATERIAL

Filed Sept. 11, 1968     6 Sheets-Sheet 1

INVENTOR.
FRED H. ANCKER
BY
ATTORNEY

INVENTOR.
FRED H. ANCKER
BY
ATTORNEY

INVENTOR.
FRED H. ANCKER

BY

ATTORNEY

March 10, 1970     F. H. ANCKER     3,499,957

METHOD FOR PRODUCING SUBSTANTIALLY UNIFORM CALENDERED MATERIAL

Filed Sept. 11, 1968     6 Sheets-Sheet 6

INVENTOR.
FRED H. ANCKER

BY

ATTORNEY

United States Patent Office 3,499,957
Patented Mar. 10, 1970

3,499,957
METHOD FOR PRODUCING SUBSTANTIALLY
UNIFORM CALENDERED MATERIAL
Fred H. Ancker, Bound Brook, N.J., assignor to Union
Carbide Corporation, a corporation of New York
Continuation-in-part of application Ser. No. 398,182,
Sept. 22, 1964. This application Sept. 11, 1968, Ser.
No. 759,013
Int. Cl. B29d 7/14
U.S. Cl. 264—175
12 Claims

ABSTRACT OF THE DISCLOSURE

Method for producing calendered thermoplastic material of substantially improved thickness uniformity which comprises: passing the material through a calendering system comprised of at least three coplanar rolls, the penultimate roll of said coplanar rolls being substantially more flexible than the other of said coplanar rolls, maintaining equidistance in the gauging nip formed between said penultimate roll and the ultimate roll by crowning at least one of the rolls forming said gauging nip to provide equidistance in said gauging nip at the maximum roll separating force, and maintaining equidistance in said gauging nip for lesser roll separating forces through commensurate adjustment of the clearance between said rolls.

This application is a continuation-in-part of application Ser. No. 398,182, filed Sept. 22, 1964, now abandoned.

This invention relates to the calender processing of elastomeric and plastic materials. More particularly, this invention relates to a calender roll system and method which provides improved thickness uniformity in calendered film and sheeting made from elastomeric and plastic materials of widely varying melt viscosities.

Calendering is a continuous thermoforming process wherein sheets or film are formed from a heat softened thermoplastic mass by squeezing said mass between one or more parallel pairs of rolls. The calendering process is well known in the art and reference is made herein to general reviews of the subject by D. I. Marshall in "Processing of Thermoplastic Materials," E. C. Bernhardt, Reinhold Publishing Corporation, New York (1962) and F. H. Ancker and H. J. Rutherford in "The Encyclopedia of Engineering Materials and Processes," H. R. Clauser, Reinhold Publishing Corporation, New York (1963).

Calendered film and sheeting has been often credited with a high degree of thickness uniformity, greatly exceeding that attainable by other forming processes such as extrusion and casting. Nevertheless high precision is currently attainable only at a marked sacrifice in versatility, i.e., restrictions in the use of a given calender to a small range of materials and film thicknesses. Conversely, if a given calender must handle a variety of materials and thicknesses, serious thickness variations result. As a consequence, it has become common practice to distinguish between calenders for film (2-10 mils) as opposed to calenders for sheeting (10-40 mils); similarly, calenders for rigid poly(vinyl chloride) are distinguished from calenders for plasticized poly(vinyl chloride). When the cost of a modern calendering line is considered, the disadvantage of such limitations in the use of a given production line is obvious. In fact, this inverse relationship between precision and versatility is one of the classical problems in calendering.

Accordingly, it is an object of the present invention to provide a method for markedly improving the ability of a given calender to produce a wide range of uniform film thicknesses from a variety of elastomeric and plastic materials of widely varying melt viscosities.

It is another object of this invention to enable crown corrections by simple adjustments of the internal roll separating forces in the calender, thus eliminating the need for roll crossing or external roll bending devices with their associated disadvantages.

It is still another object of this invention to enable the use of larger calender roll faces than have heretofore been considered economically feasible.

It is a further object of this invention to simplify and to reduce the overall size and cost of the calendering apparatus.

In accordance with the present invention, the above as well as other objects can now be achieved by employing a calender system adapted to produce material of substantially improved thickness uniformity comprised of at least a series of three coplanar cooperating rolls, the penultimate roll of said coplanar rolls being substantially more flexible than the other of said coplanar rolls, and at least one of the rolls forming the gauging nip being crowned to provide equidistance in said gauging nip at a given roll separating force. There is thus provided a means for continuously producing calendered material of substantially improved thickness uniformity by passing the material, in a heat softened and flowable state, through said calendering system and maintaining equidistance in the gauging nip formed between the penultimate roll and the ultimate roll by crowning at least one of the rolls forming said gauging nip to provide equidistance in said gauging nip at a given roll separating force, and maintaining equidistance in said gauging nip for other roll separating forces through commensurate adjustment of the net separating force acting on the penultimate roll.

For a better understanding of the present invention, reference is made to the acompanying drawings, wherein.

Figure 1:
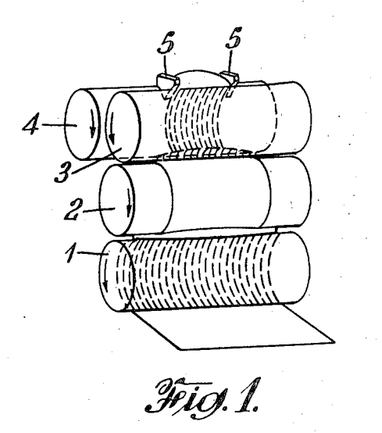
FIGURE 1 is a perspective view of the calendering process on a conventional "inverted-L" calender.

Referring now to the drawings, FIGURE 1 is a perspective view of a calendering process on a conventional inverted-L calender. A heat softened or dough-like mass of elastomeric or plastic material is fed to the upper pair of calender rolls comprised of rolls 3 and 4, being constrained from transverse flow by a pair of guide plates 5. As the molten mass passes through the clearance between rolls 3 and 4, commonly called the roll "nip" or "bite," a rough molten sheet is formed which subsequently enters into the roll nip between rolls 3 and 2. By adjusting the 3–2 roll nip to a clearance smaller than or equal to the clearance between rolls 4 and 3, a kneading bead of the thermoplastic material, commonly called a "bank," is allowed to form in front of the 3–2 roll nip. The emerging molten sheet assumes the width of the preceding bank and, upon entering the 2–1 roll nip, which again is adjusted to a clearance smaller than or equal to that of the 3–2 roll nip, the process repeats itself.

After steady state conditions have been reached, the sheet widths and thicknesses on the individual rolls are related as follows:

$$v_1 \cdot w_1 \cdot t_1 = v_2 \cdot w_2 \cdot t_2 = v_3 \cdot w_3 \cdot t_3 \qquad (1)$$

wherein $v$=peripheral roll sped, $w$=sheet width, and $t$=sheet thickness, the respective indices referring to the roll numbers. Also, for any calendering conditions $$w_1 \geqslant w_2 \geqslant w_3 \text{ and } t_1 \leqslant t_2 \leqslant t_3 \qquad (2)$$

The final sheet width and thickness is determined by the last roll nip, i.e., by the bank width and by the clearance between the ultimate roll 1 and the penultimate roll 2. The last roll nip will, therefore, hereinafter be referred to as the gauging nip.

A thermoplastic bank exerts a force on the adjacent rolls, commonly referred to as a roll separating force. The roll separating force is given by the approximate relationship:

$$F = \eta v \cdot d \cdot w \left( \frac{1}{h} - \frac{1}{H} \right) \qquad (3)$$

wherein $\eta$=apparent melt viscosity of the molten mass at given processing conditions, $v$=peripheral roll speed assuming the peripheral roll speeds of adjacent rolls equal), $d$=roll diameter, $w$=the sheet width on the exit side of the roll nip which is equal to the bank width, $h$=the clearance between the adjacent rolls, and H=the diameter of the kneading bead or bank which forms on the entrance side of the roll nip. This separating force exerted on the rolls by the bank is responsible for thickness variations, both in the longitudinal direction as well as in the transverse direction of the calendered sheet.

Longitudinal thickness variations, commonly referred to as "gallop," can be caused by inadequate concentricity of the rolls and/or bearings. However, a special problem is associated with clearances in the bearings. In order to allow for thermal expansion of the roll necks, the bearing clearance is usually in the range of about $\frac{1}{1000}$ of an inch per inch of roll neck diameter for roller bearings to about $\frac{2}{1000}$ of an inch per inch of roll neck diameter for sleeve bearings. When the rolls forming the gauging nip lay in a plane at right angles to that of the preceding roll pair, such as in Z-type calenders, these bearing clearances do not cause particular problems since once steady state calendering conditions have been reached the roll separating force of the gauging nip holds the roll necks in stable equilibrium positions against the distant sides of the bearings. However, when the preceding roll or rolls are coplanar with the gauging rolls, as in I- or L-type calenders, the penultimate roll is exposed to opposing separating forces.

Figure 2:
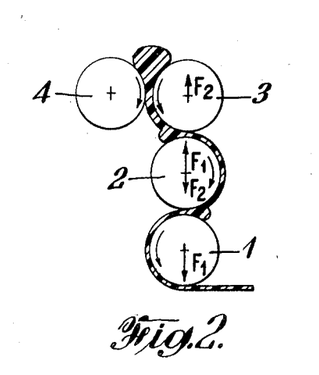
FIGURE 2 is a schematic illustration of the vertical roll separating forces arising in the operation of a conventional "inverted-L" calender.

FIGURE 2 illustrates the above situation as it arises in a conventional inverted-L calender, wherein the penultimate roll 2 is subject to a separating force ($F_1$) from the gauging nip 2–1 and an opposing force ($F_2$) from the preceding roll nip 3–2 (horizontal and gravitational force components have been omitted for the sake of simplicity). If ($F_2$) approaches ($F_1$), the net force on the penultimate roll 2 vanishes and the roll is free to "float" within the clearance of its bearing; consequently, thickness control is lost. This situation is conventionally remedied by reducing the sheet width ($w_2$) by reducing the width of the bank formed in front of the 3–2 nip, i.e., increasing the thickness of the sheet ($t_2$) formed by the 3–2 nip. The separating force ($F_2$) acting on the penultimate roll 2 is thereby reduced (Equation 3) forcing said penultimate roll 2 up into equilibrium position against the upper side of its bearing. The "floating" problem can also be alleviated mechanically by means of light auxiliary bearings, usually called "zero-clearance" or "pullback" devices attached to the roll necks to hydraulically or by a spring action force the necks of the penultimate roll 2 against the side of their main bearings away from the gauging nip. These techniques permit calendering of film and sheeting with satisfactory longitudinal thickness control even on calenders with large bearing clearances.

Transverse thickness variations, however, are much more problematical. Transverse thickness variations are caused by the deflection of the gauging rolls as they are subjected to the roll separating forces from the calendering bites. To compensate for these deflections, one, usually the ultimate roll 1, or sometimes both of the gauging rolls are commonly given a slightly convex surface contour referred to generally as a convex roll "camber" or "crown." This "crown" or increase in diameter progressively from the ends to the center of the roll is made to compensate for the roll deflection caused by the roll separating force of a given material having a particular melt viscosity and being calendered at a specific temperature, speed and thickness. As seen in Equation 3, such a crown is basically capable of offering accurate correction only at a given set of conditions. In practice, however, it is sometimes possible to attain an acceptable transverse thickness profile within a narrow range of thicknesses. This is done by suitable adjustments in roll temperatures and/or roll speeds, thereby changing the melt viscosity to maintain the original separating force and roll deflection.

Nevertheless, the roll deflection problem severely limits the use of a given calender to a very narrow range of melt viscosities and film thicknesses. Many attempts have heretofore been made to overcome this problem. The simplest of these is to increase the roll diameter. Roll deflections are inversely proportional to the fourth power of the roll diameter. Therefore, calenders for elastomeric and plastic materials are as a general rule built with relatively large roll diameter to roll face ratios, e.g., about 0.3 to 0.4. The additional enlargement of this ratio which is necessary to adequately reduce the roll deflections for practical ranges of roll separating forces, however, leads to such a substantial increase in the overall size of the calender apparatus that it becomes prohibitively expensive, the more so the larger the roll face of the calender.

Figure 3:
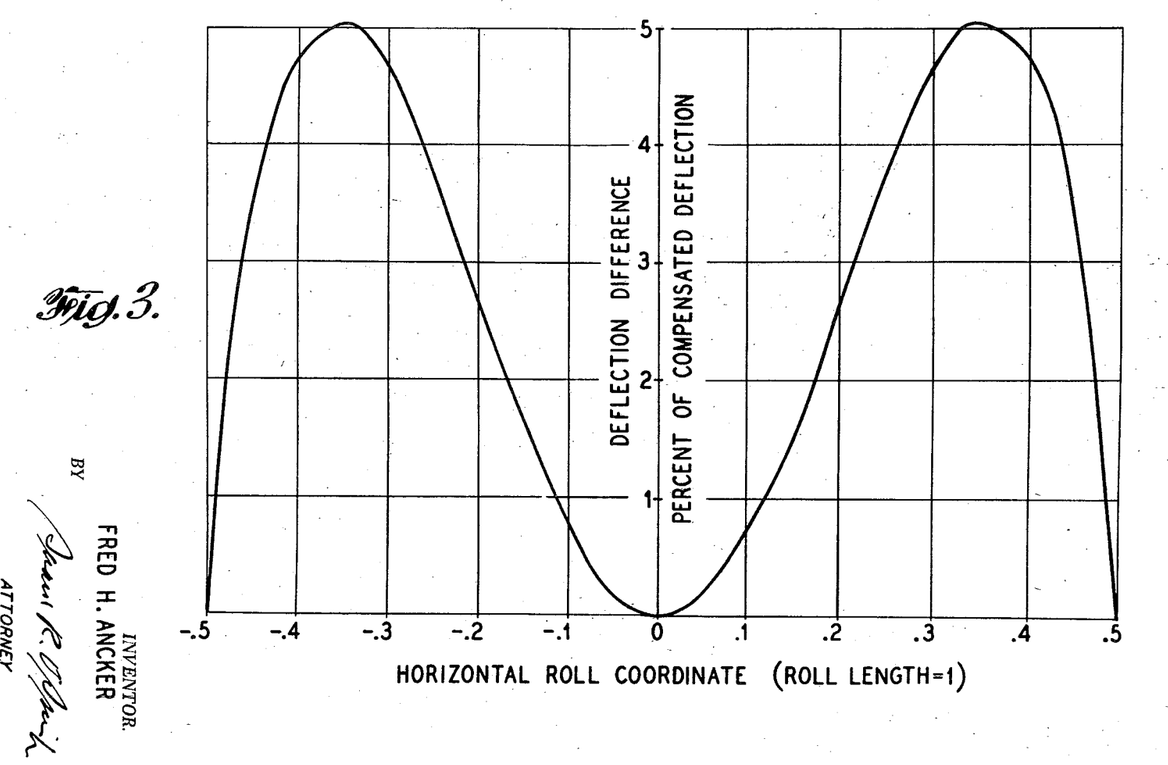
FIGURE 3 is a graphic illustration of the compensated deflection profile obtained by conventional roll bending.

Two methods are currently used commercially to attain additional crown correction of the gauging rolls: "roll crossing" and "roll bending." Roll crossing is a deliberate misalignment of the axes of the gauging rolls, which increases the roll clearance at the roll ends while it maintains it at the middle of the roll as, for example, described in U.S. 8,965,920. This phenomenon is comparable to the formation of a roll crown. Roll bending consists of application of bending forces to a pair of auxiliary bearings located on the roll necks outside of the regular bearings as, for example, described in U.S. 2,611,150. Roll bending is usually applied to the ultimate roll although it is sometimes applied to both of the gauging rolls. Both of these methods, however, have mechanical limitations, for example, roll crossing cannot become too extensive before the kneading action of the bank is disturbed, upsetting the calendering process; roll bending results in very high bearing loads and consequent excessive wear of the main and/or auxiliary bearings when large corrections are attempted. More serious limitations on the use of roll crossing or roll bending stem from the inability of both of these methods to accurately compensate for the actual deflection of the calender rolls. The situation is illustrated graphically in FIGURE 3 for a uniformly distributed load, i.e., a calendering bank, opposed by bending moments at the roll ends as occurs in roll bending. It can be seen that when the deflection is completely compensated at the middle of the roll (O horizontal roll coordinate), a deviation of about 5 percent of the compensated deflection occurs at a distance of about 35 percent of the roll length from the center of the roll, neglecting the roll necks in the calculation. A similar curve is obtained with roll crossing. These curves represent the notorious transverse "ox-bow" contour of calendered film and sheeting which is all too familiar to those skilled in the calendering art, the origin of which stems from exceeding the practical correction capabilities of the roll crossing and bending systems. To keep within acceptable limits for these systematic transverse thickness variations, it is usually necessary to limit the range of crown correction by crossing or bending to 2–3 mils for L- and I-type film calenders, where in the main only the ultimate roll deflects freely, to 1–1.5 mils for Z-type film calenders, where both of the gauging rolls are free to deflect.

It is readily apparent that both roll crossing and roll bending compensation techniques offer only a very limited improvement in the range of film thicknesses and melt viscosities which can be processed satisfactorily on a given calender. In actual production practice, it is still necessary to distinguish between film calenders (2–10 mils) and sheeting calenders (10–40 mils). It is similarly necessary to distinguish between calenders for rigid poly(vinyl chloride) as opposed to calenders for plasticized poly(vinyl chloride). A change over from one type of product to another requires costly and time-consuming changes in basic roll crowns, either by roll honing, i.e., grinding the rolls to the desired crown which, due to the exact requirements for perfect roll concentricity, cannot be done frequently without seriously affecting the accuracy of the rolls, or otherwise by replacement of the large and bulky calender rolls which is extremely cumbersome and costly.

The present invention overcomes the limitations which have heretofore existed by providing a simple crown adjustment system which obviates the need for external correction such as roll crossing or roll bending by harnessing the internal forces acting on the calender rolls.

In a preferred embodiment of the present invention, there is provided a substantially more flexible, crowned calender roll as the penultimate roll interposed between conventional cylindrical ultimate and antepenultimate calender rolls, the axes of all of said rolls being substantially coplanar and forming a cooperating three-roll system. Equidistant roll clearance is continuously maintained in the gauging nip between the penultimate and ultimate roll by crowning the penultimate roll to match the deflection of the ultimate roll when said penultimate roll is undeflected and said ultimate roll is at its maximum deflection, and, for lower separating forces, equidistance across the gauging nip is maintained by offsetting the deflection of the ultimate roll with the effective crown of the more flexible penultimate roll, i.e., the undeflected crown minus the deflection of the penultimate roll caused by commensurate adjustment of the net separating force acting upon it. The plane formed by the axes of said three rolls can have any inclination in space and if any preceding rolls are used before said conventional antepenultimate roll such other roll or rolls can have any geometric arrangement in space.

The flexibility of a calendar roll varies inversely with its flexural rigidity, i.e., the product EI, wherein E is the modulus of elasticity or Young's modulus for the roll material and I is the moment of inertia of a circular cross-section of the main body of the roll taken with respect to a cross-sectional diameter. The useful range of higher flexibility of the penultimate roll of the present invention corresponds to a flexural rigidity ratio or EI product ratio of the penultimate roll to the ultimate roll of between about 0.03 and 0.75. A flexural rigidity ratio of the penultimate roll to the ultimate roll between about 0.10 and 0.40 has been found to be the general optimum range for the calendering of thermoplastics; however, other thermoplastics, elastomers or processing conditions may make it desirable to select other optima.

It is possible to effect some increase in flexibility by selection of a less rigid material for the penultimate roll than for the ultimate calender roll, for example, by employing a cast iron penultimate roll when the ultimate roll is made from steel. Young's modulus for cast iron is approximately half of what it is for steel. However, increases in flexibility can be more easily attained by lowering the external roll diameter of the penultimate roll since $$I = \frac{\pi}{64} d^4 \qquad (4)$$

wherein I is the moment of inertia taken as described above and $d$ is the external diameter of the roll body. For purposes of simplicity, the negative contributions due to the hollow roll core and channels used for circulation of the heating media have been neglected. However, variations in the internal diameter of the roll core as well as the number and arrangement of the channels can, if desired, be employed to vary the moment of inertia and consequently effect some increase in flexibility. A roll diameter of the penultimate roll corresponding to about 60 to 70 percent of the diameter of the ultimate roll is thus sufficient to bring the flexibility of the penultimate roll into the optimum range of the flexural rigidity ratio described above when the penultimate roll is made from the same material as the ultimate roll. Thus, it can be seen that while any means of increasing the flexibility of the penultimate roll in respect to the ultimate roll is contemplated within the scope of this invention, for purposes of simplicity, ease of manufacturing, and economic considerations, employing a penultimate roll having a smaller diameter in respect to the diameter of the ultimate roll is preferred.

Figure 4:
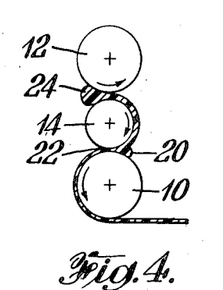
FIGURES 4 through 7, respectively, are schematic illustrations of the relative positions of the calender rolls in respect of the flexible roll of the present invention in I, inverted-L, L and Z calender configurations.
Figure 5:
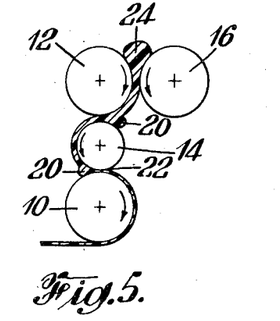
Figure 6:
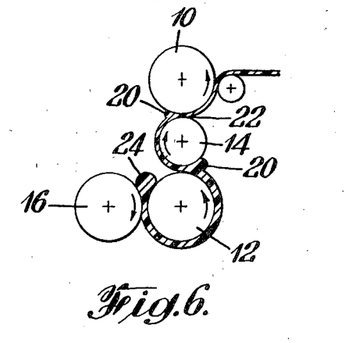
Figure 7:
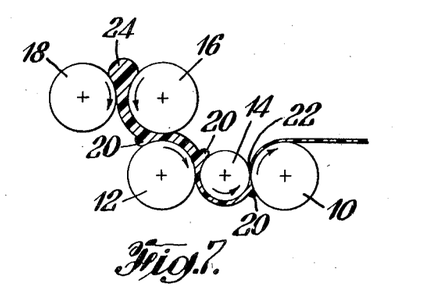

Referring now to FIGURES 4 through 7, various calender train configurations are shown schematically illustrating the relative position of the calender rolls in respect to the smaller diameter, more flexible penultimate roll of the present invention. FIGURE 4 illustrates an I calender configuration; FIGURE 5, an inverted-L calender configuration; FIGURE 6, an L calender configuration; and FIGURE 7, a Z calender configuration.

The various embodiments of calender train configurations shown in FIGURES 4 through 7 are comprised of an ultimate roll 10, an antepenultimate roll 12 spaced from and parallel with said ultimate calender roll 10, a penultimate roll 14 having a smaller diameter than either the ultimate or antepenultimate rolls, interposed between the opposed surfaces of said ultimate and ante-penultimate rolls and being coextensive therewith, the axes of said calender rolls 10 and 12 being substantially coplanar with that of the penultimate roll 14. One or more preceding rolls, such as rolls 16 and 18 in FIGURES 5 through 7, can also be employed in any or all of the calender train configurations contemplated within the present invention. Said preceding rolls 16 and 18 are spaced from the antepenultimate roll 12 and are adapted to cooperate therewith. Banks of kneading molten or dough-like elastomeric or plastic material 20 are shown in front of each roll nip. The gauging nip 22 is formed by the opposed surfaces of the ultimate calender roll 10 and the penultimate roll 14. The molten or dough-like mass 24 emerges from the gauging nip 22 as a continuous film or sheet having a substantially uniform thickness profile and is thereafter cooled and passed to wind-up or cutting in conventional fashion.

Figure 8:
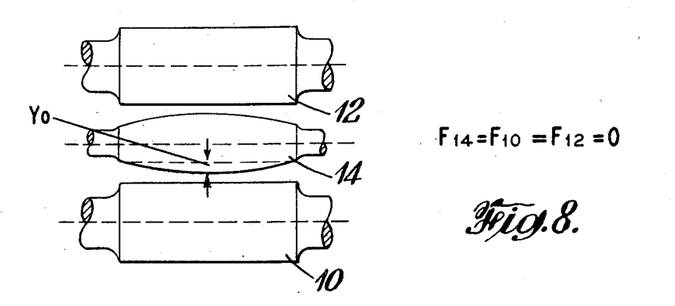
FIGURE 8 is a schematic illustration in exaggerated form of the roll system of the present invention under no load.
Figure 9:
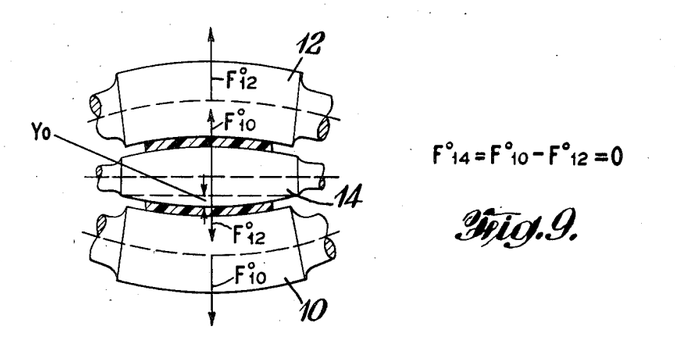
FIGURE 9 is a schematic illustration in exaggerated form of the roll system of the present invention under substantially equal load.
Figure 10:
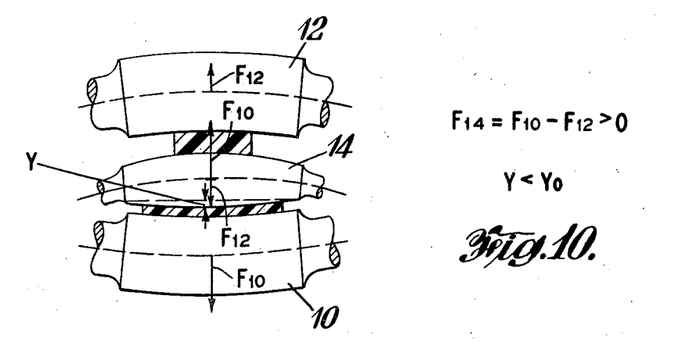
FIGURE 10 is a schematic illustration in exaggerated form of the roll system of the present invention illustrating the method provided by the present invention for compensating for separating forces lower than the maximum intended separating force.

The mode of operation of the preferred embodiment of the cooperating three-roll system of the present invention to control transverse thickness uniformity becomes more fully apparent with reference to FIGURES 8 through 10, wherein the roll crowns and roll deflections are illustrated schematically in an exaggerated manner. In FIGURE 8, the roll system is shown under no load and the two cylindrical rolls, the ultimate roll 10 and the antepenultimate roll 12, and also the crowned flexible penultimate roll 14 are shown in their undeflected states. FIGURE 9 illustrates the situation wherein the two opposing roll separating forces acting on the flexible penultimate roll are approximately equal in magnitude, i.e., $F°_{10}=F°_{12}$. In this situation, the flexible penultimate roll remains substantially undeflected. Therefore, if the crown of the penultimate roll ($y_o$) is made to perfectly match the deflection of the ultimate roll resulting from separating force $F°_{10}$, the resulting film will emerge with a perfectly flat transverse thickness profile. It is readily apparent, however, that either one or both of the rolls 10 and 14 forming the gauging nip must be provided with a crown such that the gauging nip is equidistant at the maximum roll separating force. Preferably, only the flexible penultimate roll 14 is provided with such a crown while the other rolls are kept cylindrical. For a lower separating force $F_{10}$, such as results, for example, from changes to lower melt viscosity, a greater film thickness or a slower calendering speed, the ultimate roll will deflect less and the crown of the penultimate roll will provide excessive compensation resulting in a film being thinner at the center than at the edges. However, the present invention provides means for the correction of such a situation by increasing the sheet thickness ($t_{14}$) (=reducing the width $w_{14}$) of the sheet being formed between the penultimate roll and the antepenultimate roll. $F_{12}$ is thereby reduced, creating a net force upwards on the penultimate roll $F_{14}=F_{10}-F_{12}$ until the original crown on the penultimate roll less the upwards deflection, equals the new and smaller deflection of the ultimate calender roll, thus again creating an equidistant roll clearance in the gauging nip.

Accordingly, the present invention provides a method and means for continuously maintaining an equidistant roll clearance in the gauging nip between rolls 10 and 14 by imparting a crown preferably to the penultimate roll 14 essentially equivalent to the deflection of the ultimate roll 10 when the calender is operated at the maximum intended separating force $F°_{10}$, e.g., at high melt viscosities, formation of thin films, high calendering speed and the like. For lower separating forces such as result from employing lower resin viscosities, forming thicker films or sheeting, or running at lower calendering speeds and the like, equidistance in the gauging nip is continuously maintained by increasing the clearance between the penultimate roll 14 and the antepenultimate roll 12, i.e., by decreasing the sheet width ratio $w_{14}/w_{10}$ about the penultimate roll 14 as shown in FIGURE 10.

Figure 11:
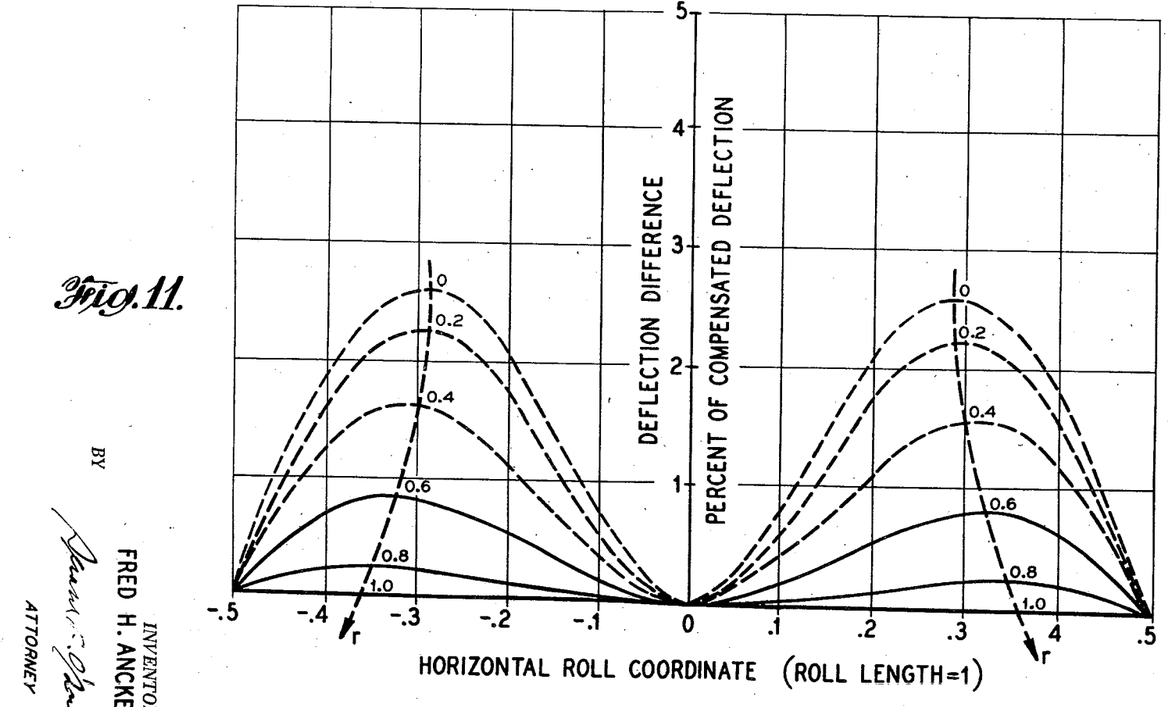
FIGURE 11 is a graphic illustration of the compensated deflection profile obtained by the present invention for a range of sheet width ratios (r)
Figure 12:
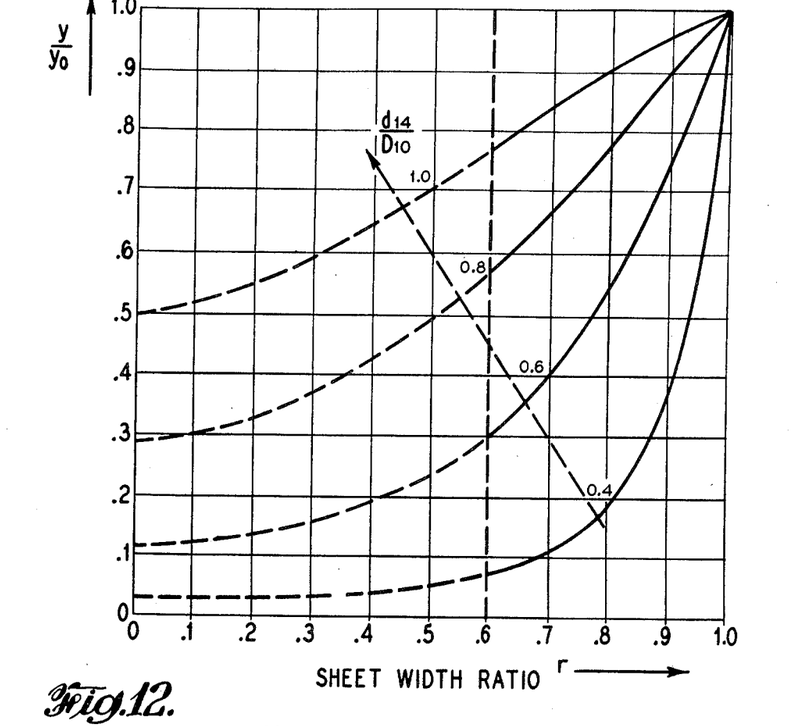
FIGURE 12 is a graphic illustration of the effective crown adjustment obtained by varying the sheet width ratio (r) for a range of roll diameter ratios.

The vast improvement provided by the present invention as compared to the methods currently employed, i.e., roll crossing and roll bending, is illustrated in FIGURES 11 and 12. FIGURE 11 graphically illustrates the deviation between the roll deflection resuting from a uniform load (calendering bank in the gauging nip) compensated by a centered, partial load (calendering bank in the preceding nip) for a range of sheet width ratios $w_{14}/w_{10}$, hereinafter designated as ($r$). The curves are shown on the same scale as the similar curve for the bending correction in FIGURE 3, i.e., again neglecting the roll necks in the calculation. It can be seen that for sheet width ratios ($r$) in the range of about 0.2 to 1.0 at least a 50 percent decrease in the deflection is obtained over the roll bending or roll crossing corrections. Moreover, in the preferred range of sheet width ratios ($r$) between about 0.6 and 1.0 inclusive (fully drawn curves), the difference in the deflection is at least fivefold smaller than was the case for roll bending or roll crossing corrections. Consequently, while the methods heretofore employed as previously described for reasons of thickness uniformity generally are limited to crown corrections up to 2–3 mils (I and L calenders) and 1–1.5 mils (Z calenders), the present invention premits corresponding crown corrections at least up to about 10–15 mils for all of the calender configurations. This illustrates significantly how the internal roll separating forces in a calender are in a much better position to compensate accurately for the roll deflections than are externally-applied roll bending forces or roll crossing corrections.

In order to attain the large crown corrections provided by the present invention, it is considered critical that the penultimate roll be more flexible than the ultimate roll.

The net force available for deflection of the penultimate roll $F_{14}$ can be obtained by the approximate relationship assuming isothermal conditions.

$$F_{14}=F_{10}\left[1-\left(\frac{w_{14}}{w_{10}}\right)^{2+n}\right] \quad (5)$$

wherein $F_{10}$=roll seperating force in the gauging nip, $w_{14}$=sheet width on the penultimate roll, $w_{10}$=sheet width on the ultimate roll, and $n$ is the exponent in the empirical power law expression for the viscosity of non-Newtonian melts, i.e., $$\frac{\eta}{\eta_o}=\left(\frac{S}{S_o}\right)^n \quad (6)$$

wherein $\eta$ is the apparent melt viscosity and S is the shear rate. For purposes of illustration, a typical value for plasticized poly(vinyl chloride) of $n=-0.70$ will be employed herein. It can be seen from Equation 5 that, within the preferred range of sheet width ratios, i.e., between about 0.6 and 1.0, inclusive, $F_{14}$ can be varied between 0 and 50 percent of $F_{10}$.

The relationship illustrating the change afforded by the force $F_{14}$ in the effective crown ($y$) of the penultimate roll 14 (see FIGURE 10) from the original, undeflected crown of the penultimate roll ($y_o$) (see FIGURE 9) for variations in sheet width ratio ($r$) between 0.6 and 1.0, inclusive, is given by the following approximate relationship assuming isothermal conditions:

$$\frac{y}{y_o}=\frac{\delta}{1+\delta-fr^{2+n}} \quad (7)$$

wherein:

$$\delta=\frac{(EI)_{14}}{(EI)_{10}}\cong\left(\frac{d_{14}}{D_{10}}\right)^4 \quad (8)$$

$$r=w_{14}/w_{10} \quad (9)$$

$$f=\frac{8-4r^2+r^3}{5} \quad (10)$$

and wherein $\delta$ is the flexural rigidity ratio of the penultimate roll to the ultimate roll, $d_{14}$ is the external diameter of the penultimate roll, $D_{10}$ is the external diameter of the ultimate calender roll, $r$ is the sheet width ratio, and $f$ is a correction factor due to the difference in the deflection curves resulting from the different width of the gauging bank and the preceding bank. FIGURE 12 is a graphical representation of Equation 7 for a range of roll diameter ratios, again using the value of $n=-0.70$ for plasticized poly(vinyl chloride). In the preferred operating range of sheet width ratios ($r$) between about 0.6 and 1.0, inclusive (fully drawn curves), it can be seen that the increased flexibility of the penultimate roll attained by decreasing its diameter or by a commensurate change in the modulus of elasticity (see Equation 8) affords a significant increase in the crown adjustment range. For example, a penultimate roll diameter which is 60 percent of the diameter of the utimate roll will enable the effective crown of the penultimate roll to be varied about 70 percent, e.g., from $y_0=16$ mils to $y=5$ mils, or from $y_0=10$ mils to $y=3$ mils.

From the discussion of the accuracy of the crown correction methods heretofore employed, it is seen that, in spite of the greatly extended crown adjustment range offered by the present invention, the systematic film thickness variations remain a fraction of what they are with bending or crossing corrections. Moreover, as shown in FIGURE 12, the combined use of a flexible penultimate roll and direct crown adjustment by variation of the opposing bank widths offers its greatest advantage for high roll deflections ($y_0$ large), i.e., thin, rigid films and/or wide film and sheeting. This is exactly the region where high precision is of the greatest commercial value and at the same time where the systems heretofore employed are most inadequate.

Employing an inverted-L calender for purposes of illustration, one mode of operation of the present invention is shown in FIGURES 13 through 17. The roll system consists of four rolls, preferaby three cylindrical calender rolls: the ultimate roll 10, the antepenultimate roll 12, the offset roll 16, and a smaller diameter penultimate roll 14 interposed between the ultimate roll 10 and the antepenultimate roll 12. The calender rolls are suspended in two posing side frames 19 by means of bearing blocks 36 and 37. The bearing block 37 for the penultimate roll 14 is suspended in a fixed position as described more fully hereinbelow. The roll bites or roll clearances are adjusted by movement of bearing blocks 36 for rolls 10, 12 and 16 by means of adjusting screws 34. The rolls are driven from an external power supply (not shown), the torque being transferred through splined joints between the drive shafts 26 and the roll shafts 28. From the other side of the frame 19, heating and cooling media (not shown) are circulated through the rolls through rotary unions 30. Also, in addition to the usual pair of bank guides 40 between the offset roll 16 and the antepenultimate roll 12, it is considered preferable to mount an auxiliary pair of bank guides 42 between the penultimate roll 14 and the ultimate roll 10. These auxiliary bank guides 42 facilitate the control of the ultimate calendering bank between rolls 14 and 10 when the calender is operated with the sheet width ratio ($r$) close to unity.

There are no criticalities with regard to bearing types, clearances and mounting beyond those normally considered in conventional calender designs with respect to the conventional calender rolls 10, 12 and 16. However, since the penultimate roll is sometimes operated with substantially balanced forces, it is considered a preferred embodiment of this invention to employ a mechanical mounting of the penultimate roll bearings as well as its bearing housings which eliminate the problem of roll floating as described hereinabove and the ensuing loss of longitudinal thickness control in the calendered film. It is, of course, possible to prevent floating of the penultimate roll by decreasing the sheet width ratio ($r$), but this limits the use of this ratio for the purpose of crown correction. Two mountings which satisfactorily prevent roll floating are shown in FIGURES 15 and 16, although, as is readily apparent, any mounting which prevents roll floating is considered applicable to this invention.

Figure 15:
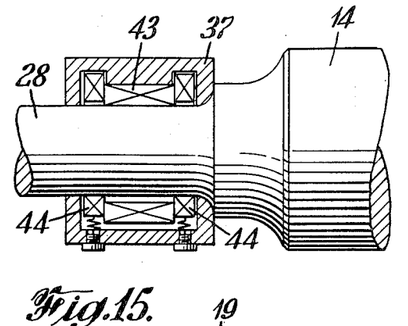
FIGURE 15 is a schematic illustration, partially in section, of an embodiment of a bearing employed to mount the flexible penultimate roll of the present invention in the appropriate bearing block.

In FIGURE 15, a normal clearance bearing 43 is employed for the penultimate roll 14 and two slim, auxiliary hydraulically or spring-loaded bearings 44 are used as pull-backs to force the roll neck 28 into stable position against the top of the main bearing 43, i.e., in the direction away from the gauging nip. The use of two pull-back bearings 44 close to and one on each side of the main bearing prevents the pull-backs from having any appreciable roll bending effect on the penultimate roll.

Figure 16:
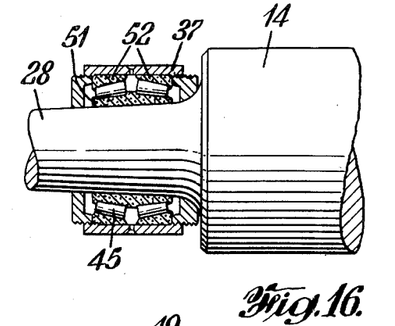
FIGURE 16 is a schematic illustration, partially in section, of another embodiment of a bearing employed to mount the flexible penultimate roll of the present invention in the appropriate bearing block.

FIGURE 16 illustrates a second mounting wherein a preloaded roller bearing 45 is mounted on the roll neck 28 with a zero-clearance fit. To prevent overloading and thus premature failure of the bearing as the penultimate roll 14 is heated to the calendering temperatures, the heating oil used for the penultimate roll is separately circulated through the roller bearing to maintain the roll neck and the inner bearing races 51 and the outer bearing races 52 at equal temperatures and at the same time serve as bearing lubricant.

Figure 17:
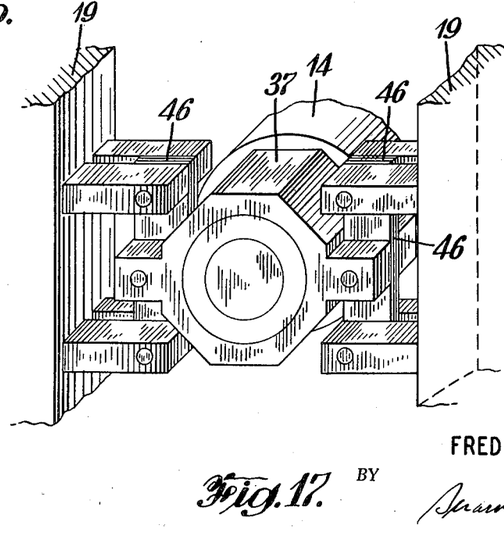
FIGURE 17 is a partial perspective view of an embodiment of a bearing mounting attaching the flexible penultimate roll of the present invention to the calender frames.

FIGURE 17 illustrates the bearing housing 37 mounted on stiff, laminar steel springs 46, which are attached to the calender frames 19. This self-aligning spring mounting has enough flexibility in a horizontal direction to accommodate the thermal expansion of the penultimate roll, yet has considerable stiffness in the vertical direction to securely position the penultimate roll.

Figure 13:
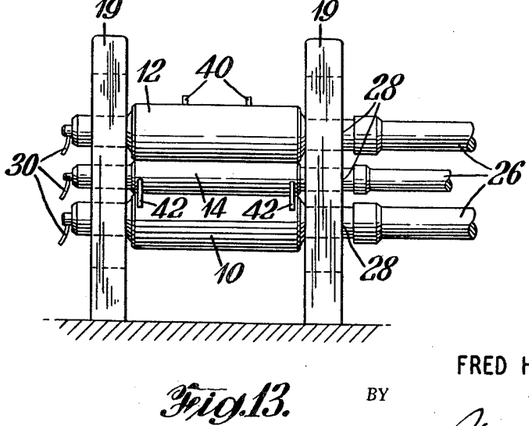
FIGURE 13 is a front elevation view of an embodiment of the roll system of the present invention.
Figure 14:
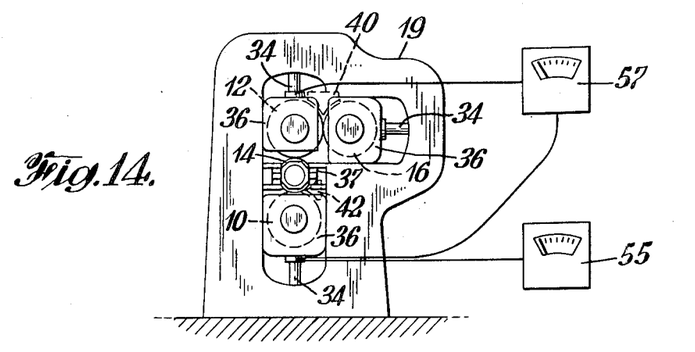
FIGURE 14 is a side elevation view of an embodiment of the roll system of the present invention.

The operation of the calender roll system of the present invention is simple and lends itself to either manual or automatic correction of the thickness profile of the material being calendered. As described above, in the preferred embodiment of this invention, the crown of the penultimate roll is made to perfectly match the deflection of the ultimate calender roll under a selected maximum load $F°_{10}$. The particular load of a given material $F_{10}$ can be readily measured by load cells acting through the adjusting screws 34 for the ultimate roll. Similarly, the net force on the penultimate roll $F_{14}=F_{10}-F_{12}$ can be measured either directly on the bearing supports for the penultimate roll or indirectly by subtraction of the load signal of the antepenultimate roll from the load signal of the ultimate roll. Therefore, one recording instrument 55 can be calibrated in separating force in the gauging nip $F_{10}$ (increasing scale) as well as in required crown correction for uniform thickness profile (decreasing scale). Another recording instrument 57 can be calibrated in net force on the penultimate roll $F_{14}$ and actual crown correction (both increasing scales).

The calender can be conveniently started up with even film width, i.e., $r=1$, $F_{14}=0$, until a film of the desired thickness emerges from the gauging nip. If $F_{10}=F°_{10}$, the film will be perfectly flat, but if $F_{10}$ is less than $F°_{10}$, the film will be thinner at the center than at the edges. The first instrument 55 will directly show the required correction and the adjusting screws for the antepenultimate roll can, therefore, be turned, opening the roll nip between said antepenultimate roll and the penultimate roll, until the same value is read on both instruments 55 and 57 indicating that the effective crown on the penultimate roll corresponds to the deflection of the ultimate roll under load $F_{10}$. Alternatively, this can be done automatically by a motor-driven screw-down or the like for the antepenultimate roll electrically directed from the two load indicators.

Accordingly, it has been shown that the present invention provides a wide extension of the range of film thicknesses and melt viscosities which can be calendered with accurate gauge control on a given calender; a simple crown adjustment system which obviates external corrections such as roll crossing or roll bending; allows the use of easily maintainable, cylindrical rolls as the regular calender rolls; and reduces the overall size and cost of the calender apparatus. Moreover, due to the wide range of crown corrections made possible by the present invention, it is now possible to employ larger calender roll faces than have heretofore been considered economically feasible.

Furthermore, additional extension of a given calender to extreme ranges of roll deflections is now made practical by exchange of the crowned flexible penultimate roll of the present invention for another of differing crown which usually weighs and costs less than half of a regular calender roll, yet provides many times the range in additional crown adjustment. It is even possible to avoid such roll changes altogether by employing roll bending means on the more flexible penultimate roll. Such roll bending means can be employed to include the low roll deflection range of heavy sheeting where the ox-bow problem becomes negligible.

While certain representative embodiments and details have been shown for the purpose of illustrating the present invention, it will be apparent to those skilled in the art that various changes and modifications can be made therein without departing from the scope or spirit of the invention.

What is claimed is:

1. Method for producing calendered material of substantially improved thickness uniformity which comprises: passing flowable thermoplastic material through a calendering system comprised of at least three coplanar rolls while preventing roll floating of the penultimate roll thereof, said material continuing about the rolls and through the gauging nip thereof in the flowable state, said penultimate roll of said coplanar rolls being substantially more flexible than the other of said coplanar rolls, maintaining equidistance in the gauging nip formed between said penultimate roll and the ultimate roll by crowning at least one of the rolls forming said gauging nip to provide equidistance in said gauging nip at a given roll separating force, and maintaining equidistance in said gauging nip for other roll separating forces by crown correction through commensurate adjustment of the clearance between said rolls.

2. Method for producing calendered material of substantially improved thickness uniformity which comprises: passing flowable thermoplastic material through a calendering system comprised of at least three coplanar rolls while preventing roll floating of the penultimate roll thereof, said material continuing about the rolls and through the gauging nip thereof in the flowable state, said penultimate roll of said coplanar rolls having a flexural rigidity ratio in respect to the ultimate roll of said coplanar rolls between about 0.03 and 0.75, inclusive, maintaining equidistance in the gauging nip formed between said penultimate roll and the ultimate roll by crowning at least one of the rolls forming said gauging nip to provide equidistance in said gauging nip at a given roll separating force, and maintaining equidistance in said gauging nip for other roll separating forces by crown correction through commensurate adjustment of the sheet width ratio ($r$) between about 0.2 and 1.0, inclusive, wherein ($r$) equals the ratio of the sheet width on the penultimate roll to the sheet width on the ultimate roll by adjusing the separation between said rolls.

3. Method for producing calendered material of substantially improved thickness uniformity which comprises: passing flowable thermoplastic material through a calendering system comprised of at least three coplanar rolls while preventing roll floating of the penultimate roll, said material continuing about the rolls and through the gauging nip thereof in the flowable state, said penultimate roll of said coplanar rolls having a flexural rigidity ratio in respect to the ultimate roll of said coplanar rolls between about 0.03 and 0.75, inclusive, while preventing roll floating of the penultimate roll, maintaining equidistance in the gauging nip between said penultimate roll and the ultimate roll by crowning the penultimate roll to provide equidistance in said gauging nip when said penultimate roll is undeflected and said ultimate roll is at its maximum deflection, and maintaining equidistance in said gauging nip for lesser deflections of said ultimate roll by offsetting said deflection of the ultimate roll with the effective crown of the penultimate roll obtained by adjusting the separation between the penultimate roll and an adjacent roll.

4. Method for producing calendered material of substantially improved thickness uniformity as defined in claim 3, wherein the flexural rigidity ratio of the penultimate roll to the ultimate roll is between about 0.10 and 0.40.

5. Method for producing calendered material of substantially improved thickness uniformity as defined in claim 3, wherein the effective crown of the penultimate roll offsets the deflection of the ultimate roll by commensurate adjustment of the sheet width ratio ($r$) between about 0.6 and 1.0, inclusive, wherein ($r$) equals the ratio of the sheet width on the penultimate roll to the sheet width on the ultimate roll.

6. The method of claim 1, wherein the clearance between said penultimate and antepenultimate rolls is adjusted, thereby increasing the sheet thickness between the penultimate roll and said adjacent antepenultimate roll.

7. Method for producing calendered material of substantially improved transverse thickness uniformity which comprises: passing flowable thermoplastic material through a calendering system comprised of at least three coplanar rolls, said material continuing about the rolls and through the gauging nip thereof in the flowable state, the penultimate roll of said coplanar rolls being substantially more flexible than the other of said coplanar rolls, maintaining equidistance in the gauging nip formed between said penultimate roll and the ultimate roll by crowning at least one of the rolls forming said gauging nip to provide equidistance in said gauging nip at a given roll separating force, and continuously maintaining equidistance in said gauging nip for other roll separating forces by crown correction through commensurate adjustment of the clearance between said rolls.

8. Method for producing calendered material of substantially improved transverse thickness uniformity which comprises: passing flowable thermoplastic material through a calendering system comprised of at least three coplanar rolls, said material continuing about the rolls and through the gauging nip thereof in the flowable state, the penultimate roll of said coplanar rolls having a flexural rigidity ratio in respect to the ultimate roll of said coplanar rolls between about 0.03 and 0.75, inclusive, maintaining equidistance in the gauging nip formed between said penultimate roll and the ultimate roll by crowning at least one of the rolls forming said gauging nip to provide equidistance in said gauging nip at a given roll separating force, and continuously maintaining equidistance in said gauging nip for other roll separating forces by crown correction through commensurate adjustment of the sheet width ratio ($r$) between about 0.2 and 1.0, inclusive, wherein ($r$) equals the ratio of the sheet width on the penultimate roll to the sheet width on the ultimate roll by adjusting the separation between said rolls.

9. Method for producing calendered material of substantially improved transverse thickness uniformity which comprises: passing flowable thermoplastic material through a calendering system comprised of at least three coplanar rolls, said material continuing about the rolls and through the gauging nip thereof in the flowable state, the penultimate roll of said coplanar rolls having a flexural rigidity ratio in respect to the ultimate roll of said coplanar rolls between about 0.03 and 0.75, inclusive, maintaining equidistance in the gauging nip between said penultimate roll and the ultimate roll by crowning the penultimate roll to provide equidistance in said gauging nip when said penultimate roll is undeflected and said ultimate roll is at its maximum deflection, and continuously maintaining equidistance in said gauging nip for lesser deflections of said ultimate roll by offsetting said deflection of the ultimate roll with the effective crown of the penultimate roll obtained by adjusting the separation between the penultimate roll and an adjacent roll.

10. Method for producing calendered material of substantially improved transverse thickness uniformity as defined in claim 9, wherein the flexural rigidity ratio of the penultimate roll to the ultimate roll is between about 0.10 and 0.40.

11. Method for producing calendered material of substantially improved transverse thickness uniformity as defined in claim 9, wherein the effective crown of the penultimate roll offsets the deflection of the ultimate roll by commensurate adjustment of the sheet width ratio $(r)$ beween about 0.6 and 1.0, inclusive, wherein $(r)$ equals the ratio of the sheet width on the penultimate roll to the sheet width on the ultimate roll.

12. The method of claim 7, wherein the clearance between said penultimate and antepenultimate rolls is adjusted, thereby increasing the sheet thickness between the penultimate roll and said adjacent antepenultimate roll.

References Cited

UNITED STATES PATENTS

| | | | |
|---|---|---|---|
| 2,850,952 | 9/1958 | Hornbostel | 100—162 |
| 3,060,843 | 10/1962 | Moore | 18—2 |
| 3,161,125 | 12/1964 | Hornbostel | 100—162 |
| 3,366,992 | 2/1968 | Seanor | 18—2 |
| 3,405,632 | 10/1968 | Crist | 100—163 XR |

OTHER REFERENCES

Gooch, K. J., Modern Plastics, Designing Better Calenders, March 1957, pps. 165, 166, 167, 170, 172 and 293 relied on.

ROBERT F. WHITE, Primary Examiner

R. R. KUCIA, Assistant Examiner

U.S. Cl. X.R.

18—2; 100—162